US008952811B2

(12) United States Patent
No

(10) Patent No.: US 8,952,811 B2
(45) Date of Patent: Feb. 10, 2015

(54) DOUBLE DOOR CONTROLLING APPARATUS AND METHOD THEREOF

(75) Inventor: Jun Hyung No, Gunpo-si (KR)

(73) Assignee: The Korea Development Bank, Seoul (KR)

( * ) Notice: Subject to any disclaimer, the term of this patent is extended or adjusted under 35 U.S.C. 154(b) by 474 days.

(21) Appl. No.: 13/390,137

(22) PCT Filed: Aug. 13, 2010

(86) PCT No.: PCT/KR2010/005329

§ 371 (c)(1), (2), (4) Date: Feb. 13, 2012

(87) PCT Pub. No.: WO2011/019235

PCT Pub. Date: Feb. 17, 2011

(65) Prior Publication Data

US 2012/0144744 A1 Jun. 14, 2012

(30) Foreign Application Priority Data

Aug. 13, 2009 (KR) ........................ 10-2009-0074756

(51) Int. Cl.
*G08B 21/00* (2006.01)
*G08B 13/08* (2006.01)
(Continued)

(52) U.S. Cl.
CPC ............. *E05F 15/0017* (2013.01); *E05F 15/20* (2013.01); *E05Y 2400/336* (2013.01);
(Continued)

(58) Field of Classification Search
CPC .... E05F 15/0017; F02D 41/009; F02N 11/04; H02P 6/185; H02P 6/182
USPC ................. 340/540; 49/31, 35; 318/283, 490, 318/400.13, 13, 602, 400.15, 400.11, 318/400.37, 466, 487, 701, 69, 478; 73/402; 700/275
See application file for complete search history.

(56) References Cited

U.S. PATENT DOCUMENTS

| | | | | |
|---|---|---|---|---|
| 4,563,625 | A * | 1/1986 | Kornbrekke et al. | 318/603 |
| 7,539,088 | B2 * | 5/2009 | Osakabe | 369/44.13 |
| 7,589,482 | B2 * | 9/2009 | Sepe, Jr. | 318/135 |

FOREIGN PATENT DOCUMENTS

| | | |
|---|---|---|
| KR | 20-0265207 | 2/2002 |
| KR | 10-2004-0091172 | 10/2004 |
| KR | 20-0397350 | 10/2005 |

OTHER PUBLICATIONS

Fault Tolerant Operation of Induction Motor Drives with Automatic Controller Reconfiguration by Sepe et al. (2001) IEEE.*

(Continued)

*Primary Examiner* — Daniell L Negron
*Assistant Examiner* — Mancil Littlejohn, Jr.
(74) *Attorney, Agent, or Firm* — Heedong Chae; East West Law Group

(57) ABSTRACT

The present invention includes, a failure sensing part to sense the failure created in the encoder mode and sensorless mode to control the door; a main control part to convert the main operation part and backup control part mutually when a failure is sensed by the primary operation mode by the failure sensing part after deciding either of the encoder mode or sensorless mode as a primary operation mode and another one is decided as a backup operation mode; and a location/speed conversion part to perform the door control by calculating the door moving distance according to the corresponding mode when the operation mode is converted by the main control part.

5 Claims, 5 Drawing Sheets

(51) Int. Cl.
*H02P 1/00* (2006.01)
*H03K 5/00* (2006.01)
*G05B 5/00* (2006.01)
*E05F 15/20* (2006.01)
*E05F 15/00* (2006.01)

(52) U.S. Cl.
CPC ........ *E05Y2400/502* (2013.01); *E05Y 2800/22* (2013.01); *E05Y 2800/246* (2013.01); *E05Y 2800/73* (2013.01); *E05Y 2900/51* (2013.01)
USPC ...... 340/540; 340/5.1; 340/545.1; 340/545.2; 340/545.9; 318/283; 318/400.13; 318/466; 318/487; 318/701; 49/31; 700/275

(56) References Cited

OTHER PUBLICATIONS

International Search Report mailed Apr. 7, 2011 for PCT/KR2010/005329.

* cited by examiner

DOUBLE DOOR CONTROLLING APPARATUS AND METHOD THEREOF

CROSS REFERENCE TO RELATED APPLICATION

This application claims the priority of Korean Patent Application No. 10-2009-0074756, filed on Aug. 13, 2009 in the KIPO (Korean Intellectual Property Office). Further, this application is the National Phase application of International Application No. PCT/KR2010/005329, filed on Aug. 13, 2010, which designates the United States and was published in Korean.

TECHNICAL FIELD

The present invention relates to a controlling device and method of the door, more particularly, to a controlling device and its method for sensing the variable displacement of the automatic door closed/opened by motor and controlling the motion of the motor based on the sensing.

BACKGROUND OF RELATED ART

In case of the automatic door in electric train, its door is closed and opened by the motor. In the process of door closing and opening, the motor controlling circuit estimates the location or the displacement of the door and enables for the door to be closed or opened naturally and exactly by operating the motor with the driving profile to differentiate the output power depending on the estimated location.

In the estimation method for displacement, there are a type to use the encoder, a sensor for detecting the revolution of the motor (hereinafter referred to as 'encoder type") and a type to estimate the revolution amount by sensing the electric current and voltage for driving without suing the additional sensor (hereinafter referred to as 'sensorless type")

Firstly, in case of a system adapting the encoder type, an encoder which generates a certain pulses, for example 360 pulses on each turn of the motor is installed on the axle of the motor and the door control unit (DCU) calculates the displacement of the door using the motor revolution and ball screw pitch after estimating the revolving of the motor based on the pulses. This encoder type has simple configuration and algorithm and high reliability on the corresponding outcome, but the exchange is necessary due to the destruction by the reason of low durability and it has limit of noise creation from the operation of encoder.

Next, a sensorless type system detects the counter electric motive force (counter EMF) and electric current which are created in motor driving and the motor RPM and displacement of the door are calculated based on such detection. The sensorless type shall equip with the circuits for measuring the electric current and voltage. At the same time, the sensorless type can be realized in lower cost than encoder type, but it requires additional MCU (Micro Controller Unit) to perform high speed arithmetic process as its arithmetic processing is so complicated. In addition, there is a limitation of difference in its performance depending on the price of the electric current sensor. The selection of motor by the strict standard in consideration of the reliability of the motor is required because its performance is influenced by the deviation of the characteristics of each motor. The adaption frequency of the sensorless type is lower than encoder type relatively because its accuracy lags behind.

Many doors are equipped in a rolling stock of the current railway train and the closing and opening of the door are controlled by using either of encoder type and sensorless type. However, there is a big potentiality of failure creation in controlling the door due to the characteristics of many doors.

In case of failure any one of the doors, there is a limit to stop the driving without particular first aids and to return to the base due to the characteristics of the electric train considering the safety of the citizen in priority. For example, when the failure is created from the encoder in the train adapting the encoder type due to the high voltage and noise, the abnormal signal is created because the displacement of the door cannot be recognized due to the failure of the encoder in the DCU of the train. Here, the engineer has difficulty to take additional first aids because the encoder is attached at the rear part of the motor due to the difficulty of disassembly/assembly and exchange. Consequently, the engineer is forced to return to the base as the normal operation is impossible.

As it is explained, there is a permanent possibility to bring forth such severe inconveniences to the citizens in case of failure on the door of the train.

Consequently, it is inevitable to suggest the technology which does not hinder the normal operation for the convenience of the citizens by adapting the dualization technology which can operate the door normally in case of failure in door controlling of the current train.

DETAILED DESCRIPTION ON THE INVENTION

Technological Task

Accordingly, the above-mentioned conventional technology has the problem for the train to terminate the normal operation and to return to the base in case of failure in any of the doors in the train door controlling with adaption of the encoder type or sensorless type. To solve such problem is a task of the present invention.

The object of present invention is to provide the recording medium readable by the computer which recorded the program to realize the dual controlling device for the door, its method and the above-mentioned method to control the door successively in spite of failure creation by controlling the door through converting another mode to the primary operation mode for the door controlling when a failure creation is sensed on the primary operation mode decided by either of the encoder mode and sensorless mode which are concurrently operated for door controlling.

The object of present invention is to provide the recording medium readable by the computer which recorded the program to realize the dual controlling device for the door, its method and the above-mentioned method to control the door successively in spite of failure creation by controlling the door through switching the sensorless mode to the primary operation mode and using the screw pitch adapted on the encoder mode when a failure creation is sensed in the encoder mode decided as primary operation mode.

The objective of present invention is not limited to the above mentioned objectives, and the not mentioned other objectives and advantages can be understood by the following description and it can be more clearly known in an embodiment of present invention. It will be easily known that the objectives and advantages of present invention can be realized by the tools and its combination which are shown in what are claimed for the patent.

Means for Solving the Problems

The dual controlling device for the door of present invention to achieve the above objectives can be comprised of a failure sensing part to sense failure generated on an encoder mode and a sensorless mode to control a door;

a main control part to decide either of the encoder mode of the sensorless mode as a primary operation mode and another one for a backup operation mode and to convert the primary operation mode and the backup operation mode mutually when the failure is sensed in the primary operation mode by the failure sensing part; and a location/speed converting part to perform door controlling by calculating door moving distance depending on the corresponding mode as the operation mode is changed by said main control part.

The above-mentioned sensing part is able to sense the failure by checking the abnormalities on the number of pulses and the phase of the above pulses created from the encoder in the above encoder mode and to sense the abnormalities on the measured data for the voltage and electric current of the motor in the above sensorless mode.

The present convention can be comprised by including the communication part which delivers the failure creation information to the external device under the above-mentioned main control part.

In addition, the dual controlling method for the door in present invention can be comprised of a first performance stage performing door control by deciding either of an encoder mode or a sensorless mode as a primary operation mode to control the door;

a transforming stage converting the said primary operation mode to another mode when a failure is sensed in said primary operation mode; and a second performing stage controlling the door by calculating a door moving distance depending on the converted primary operation mode.

The above encoder mode and the sensorless mode can be performed concurrently regardless of the decision for the above operation mode and the above conversion stage can include the stage of delivering the information on the above failure creation to the external device.

The above primary operation mode calculates the door moving distance using the number of pulses and the screw pitch when the above primary operation mode is the above encoder mode, and the door moving distance can be calculated using the angular velocity and the screw pitch of the motor in case that the above primary operation mode is the above sensorless mode in the above the first and second performance stages.

In addition, a dual control device of the door in present invention operates the door opening and closing motor and a control device with dual operation mode to detect the moving distance of the above door comprising a failure sensing part to sense the failure in deciding the above door moving distance;

a main control part to decide either of the above dual operation modes as a primary operation mode, and converts the above primary operation mode into another mode when the above failure is sensed, and to control the operation of the above motor depending on the above door moving distance; and a location determining part to calculate the moving distance of the above door by the above primary operation mode.

In addition, the dual control device for the door in present invention is a controlling device to operate the door opening and closing motor comprising an encoder which creates the pulse heat showing the revolving of the above motor and the motor revolving sensing part equipping the electric current sensing part for sensing the load current supplied to the above motor; failure sensing part to sense the failure in the above motor revolving sensing part;

a main control part to decide either of the above pulse heat or above load current as a primary sensing signal and another one as a provisional sensing signal and to convert the primary sensing signal and the above provisional sensing signal when the above failure is sensed and to control the operation of the above motor depending on the above door moving distance; and a location deciding part which outputs the above door moving distance information created by the above primary sensing signal.

The above dual operation modes include the encoder mode and sensorless mode. At this time, either of the above encoder mode or above sensorless mode can be decided as primary operation mode and the above primary operation mode can be converted into another mode when the above failure is sensed.

In addition, the dual control device for the door in present invention is a controlling device to operate the door opening and closing motor comprising an encoder to generate the pulse heat showing the revolving of the above motor;

an electric current sensing part sensing the load current supplied to the above motor; location deciding part to calculate above door moving distance based on the above load current in the sensorless mode;

a switching part to switch for the above encoder or the location deciding part to be contacted to the above location deciding part selectively;

a failure sensing part to sense the failure in the operation of the above encoder mode; and the main controlling part which controls the above motor operation depending on the above door moving distance.

But it makes the above encoder mode be the primary operation mode and to convert the above sensorless mode into the above primary operation by controlling the above switching part when the failure creation is sensed by the above failure sensing part.

In addition, the dual control device for the door in present invention is a controlling device to operate the door opening and closing motor comprising a location deciding part to calculate the door moving distance based on the pulse heat from the encoder from the encoder mode and to calculate the above door moving distance based on the above load current in the electric current sensing part in the sensorless mode;

a switching part to switch for the above encoder or the location deciding part to be contacted to the above location deciding part selectively;

a failure sensing part to sense the failure in the operation of above encoder mode; and a main controlling part which controls the above motor operation depending on the above door moving distance.

But it makes the above encoder mode be the primary operation mode in the beginning and to convert the above sensorless mode into the above primary operation by controlling the above switching part when the failure creation is sensed by the above failure sensing part. At this time, the above failure sensing part can sense the failure by checking the number of the pulses and abnormalities on the phase of the above pulse created from the encoder in the above encoder mode and to sense the failure by checking the abnormalities on the measured voltage and current of the motor and the communication part which communicates the failure creation information to the external devices.

In addition, the dual controlling method for the door in present invention comprising a first performance stage to perform the door controlling with the primary operation mode of the encoder mode;

a switching stage to switch the above primary operation mode into the sensorless mode when the failure creation is sensed during the above decided encoder mode; and a $2^{nd}$ performance stage controlling the door control by calculating the door moving distance depending on the above switched sensorless mode using the screw pitch adapted to the encoder mode. The above switching mode may comprise the stage of informing the information of the above failure creation to the external devices, and the door moving distance using the number of pulse of the motor and above screw pitch are calculated in the above $1^{st}$ performance stage, and the above door moving distance can be calculated using the angular velocity of the motor and the above screw pitch in the above $2^{nd}$ performance stage.

On the other hand, present invention providing a function to perform the door control by deciding the either of the encoder mode or sensorless mode which are operated concurrently for the door control in the door control device equipped with the process as a primary operation mode;

a function to convert above decided operation mode and another mode into the above primary operation mode when the failure creation is sensed by the operation mode decided in the above; and a recoding medium readable by computer recorded the program to realize the door control function by calculating the door moving distance depending on the above converted primary operation mode.

In addition, present invention providing a function to perform the door control by deciding the encoder mode in the door control device equipped with the process as a primary operation mode;

a function to switch the above primary operation mode into the sensorless mode; and a recoding medium readable by computer recorded the program to realize the door control function by calculating the door moving distance depending on the above switched sensorless mode using the screw pitch adapted for the encoder mode.

The Effect of the Invention

The present invention as it was explained in the above, it has an effect to control the door successively in spite of failure in controlling the door.

In addition, present invention has an effect to prevent the failure creation on the door with low cost as well as acquiring the stability in the door controlling through controlling the door in dual methods using the encoder mode and sensorless mode.

In addition, present invention has an effect to provide the stable operation of the train without inconvenience to the citizens in the commutation time particularly because the consistent operation is available without returning to the base emergently due to the failure on the single door owing to the adaption on the door of the train.

THE EMBODIMENT FOR THE INVENTION

Figure 1A:
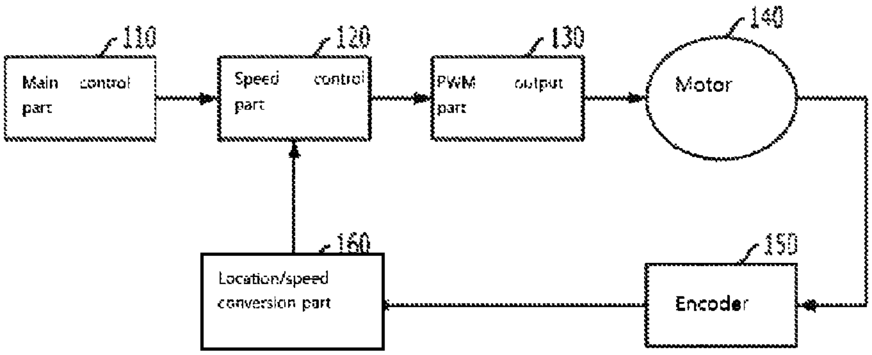
FIG. 1A is the configuration diagram for an embodiment of the encoder mode according to the present invention.

The specific structures and functional description will be only provided for the purpose of illustration of the embodiments according to the concept of the invention, so that the embodiments of the invention may be embodied in many different forms and should not be construed as being limited to the embodiments set forth herein.

The embodiments according to the concept of the invention may be changed to diverse forms, so that the invention will be described and illustrated with reference to specific embodiments. However, it should be understood that the embodiments according to the concept of the invention is not intended to limit to the specific embodiments disclosed, but they include all the modifications, equivalences, and substitutions, which are included in the scope and sprint of the invention.

It will be understood that although the terms "first," and/or "second," etc. may be used herein to describe various elements, these elements should not be limited by these terms. These terms are only used to distinguish one element from another element. Thus, a first element discussed below could be termed a second element and vice versa without departing from the nature of the present invention.

It will be understood that when an element is referred to as being "connected or coupled" to another element, it can be directly connected or coupled to the other element or intervening elements may be present therebetween. In contrast, when an element is referred to as being "directly connected or coupled" to another element, there are no intervening elements present. Other expressions such as "between" and "directly between," or "adjacent" or "directly adjacent" should be understood in a similar manner.

The terminology used herein is for the purpose of describing particular embodiments only and is not intended to limit the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Unless otherwise defined, the meaning of all terms including technical and scientific terms used herein is the same as that commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

The invention will now be described with reference to the accompanying drawings, in which exemplary embodiments of the invention are shown. The same reference numerals indicated in the drawings refer to similar elements throughout.

The details of present invention can be explained by explaining the desirable embodiment of present invention by referring the attached drawing. The same marks for the reference suggested on each drawing means the same member.

Figure 1B:
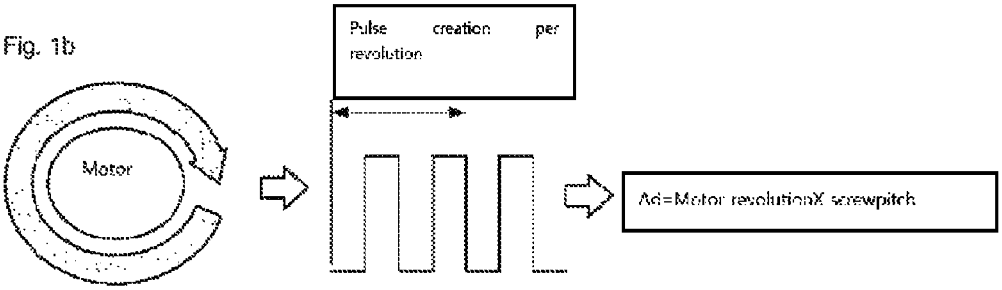
FIG. 1B shows operation explanation for the FIG. 1A.

FIG. 1A is the configuration diagram for an embodiment of the encoder mode where present invention is applied and FIG. 1B is the operation explanation of the above FIG. 1A.

The encoder mode adapting the present invention shall apply the opening and closing speed differently depending on the moving distance of the door through application for controlling the door of the train. As an example, when the door moving distance (Namely, the distance from the first starting point to the final point of the movement) during the close of the door is divided into 3 sectors, the door performs the 'accelerational motion' in the first section, 'constant motion' in the second section and 'decelerational motion' in the $3^{rd}$ section in order to prevent the body or belongings of the passenger to be intervened between the doors.

For this matter, when the door control is started from the main control part (110) as shown in FIG. 1A, eventually speed control part (120) controls the RPM of the motor (140) for operation of the door using the current control through the output part (130). At this time, the location/speed conversion part (160) calculates the moving distance of the door using the 'number of pulse' counted by the encoder (15) located at the rear side of the motor (140). And the speed control part (120) makes the opening/closing speed apply in differentiation depending on the door moving distance calculate by the location/speed converting part (160). Here, the opening/closing speed of the door can be applied differently for each section as the motor RPM (140) is controlled at the encoder mode eventually because the RPM of motor (140) corresponds to the door opening/closing speed. Desirably, magnetic encoder is used rather than the digital encoder because its resolving power (number of pulses per revolution) is low and its life span is long owing to high durability.

As it was set forth before, the door moving distance is calculated using the 'number of pulse' counted in the encoder (150) at the encoder mode. And the door moving distance (Δd) is calculated simply by the multiplication of the 'motor RPM (Detected number of pulse/number of pulse per revolution (Namely, the resolving power)) and 'the screw or the length of belt [Namely, screwpitch] corresponding to the linearly conveyed door moving distance per revolution of the motor (140). In the other expression, it is as same as the following [Mathematical equation1].

Door moving distance($\Delta d$)=Revolution frequency of motor×screwpitch [Mathematical equation1].

As an example, the door moving distance per ms is calculated as follows when the resolving power of the encoder (150) is '2 pulses/revolution,' '80 mm/revolution' of screw pitch, the gear ratio of the geared motor is '15:1' at the counting of 20 pulses during 1 ms. Firstly, the door moving distance per unit pulse (1 pulse) becomes 2.6667 mm/pulse. Namely, the door moving distance per pulse=80 mm/(15×2 pulses). Next, the door moving distance per ms becomes 53.3334 mm/ms. Namely, the door moving distance per ms=door moving distance per pulse (2.5557 mm/pulse)×the number of pulses counted for 1 ms (20 pulses).

FIG. 2A is the configuration drawing for an embodiment for the sensorless mode where present invention is adapted.

The sensorless mode with adaption of present invention makes the opening/closing speed adaption in differentiation depending on the door moving distance as it is applied to the train door control as same as in the case of encoder mode.

Figure 2:
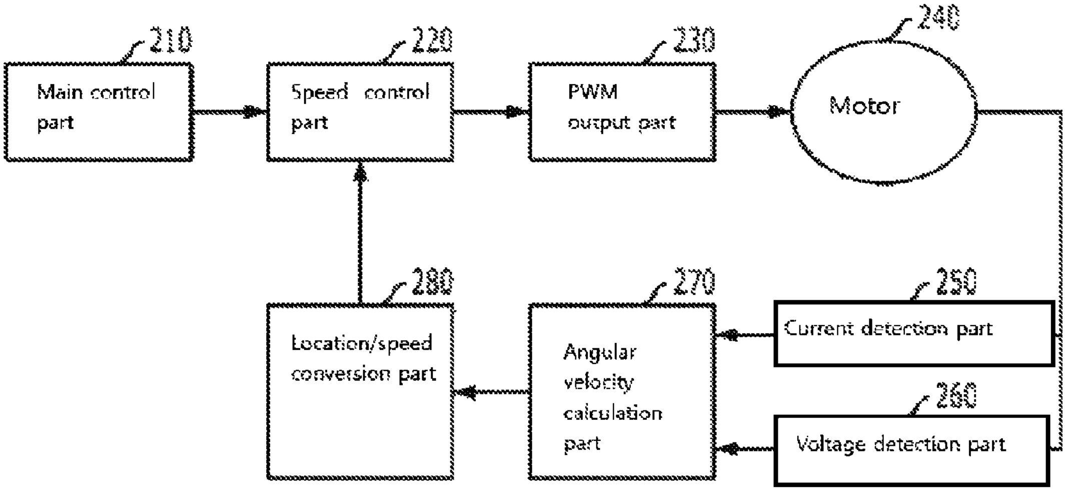
FIG. 2 shows the configuration of the embodiment of the sensorless mode with adaption of present invention.

For this matter, when the door control is started from the main control part (210) as shown in FIG. 2, eventually speed control part (220) controls the RPM of the motor (240) for operation of the door using the current control through the output part (230) of PWM (Pulse Width Modulation). At this time, the angular velocity calculation part (270) calculates the angular velocity of motor (240) using the current of motor (240) measured by the current detection part (250) and the voltage of motor (240) measured by the voltage detection part (260), and the location/speed conversion part (280) calculates the door moving distance using the angular velocity of motor which is calculated by the angular velocity calculation part (270). And the speed control part (220) applies the opening/closing speed of the door in differentiation depending on the door moving distance calculated by the location/speed conversion part (280). Additionally, it is desirable for the electric current detection part (250) and voltage detection part (260) to be realized including the AD convertor which can be understood easily for any person who is involved to this matter.

As it was set forth before, the door moving distance in the sensorless mode is calculated by estimating the angular velocity of the motor (240) using the counter electric motive force (counter EMF) constant which was set according to the standard of the voltage and standard of motor (240) measured by the current of the motor (240) by the current detection part (250) and the voltage of motor (240) measured by the voltage detection part (260).

More specifically, the angular velocity of the motor (240) is calculated using the following [Mathematical equation2].

$$E = I \times R + V$$

$$V = Ke \times \omega$$

$$E = I \times R + Ke \times \omega$$

$$\omega = \frac{E - I \times R}{Ke}.$$

[Mathematical equation 2]

Here,

E is the voltage supplied to the motor (240)

V is the voltage of the counter electro motive force of the motor (240)

I is the electric current

R is the wire wound resistance of the motor (240)

ω is the angular velocity

Ke is the counter electro motive force constant. Here, the angular velocity is proportional to the voltage of the counter electro motive force and the voltage of the counter electro motive force is calculated by using the voltage, electric current and resistance of the motor (240)

As it was shown, the angular velocity of the motor (240) can be calculated by substituting the set counter electro motive force constant according to the standard of the voltage and motor of the motor (240) which are measured by the electric current and voltage detection part of the motor measured by the electric current detection part (250) to the above [Mathematical equation2]. And the door moving distance (Δd) in the sensorless mode can be calculate by multiplying the 'motor revolving frequency divided by 2 (rad) after integration of the angular velocity [namely, angular velocity (ω)]' with respect to the time and 'the screw of the length of the belt[namely, the screwpitch] corresponding to the linearly conveyed distance of the door per revolution of the motor (240).' In the other expression, it is as same as the following [Mathematical equation3].

$$\text{Door moving distance}(\Delta d)=((\int \text{Angular velocity}(\omega)dt)/(2\pi))\times\text{screwpitch} \quad \text{Mathematical equation3}$$

As an example, the angular velocity (ω) in driving of the motor with 50% of output power in case of profile creation by measuring the voltage, electric current and resistance in the state of stall at the first operation of the door control unit (DCU) of the train.

is calculated with $$\text{Angular velocity} = \frac{(\text{Stall voltage in 50\% duty}) - (\text{Current of current consumption} \times \text{resistance})}{\text{Counter electro motive force constant}}$$

Figure 3:
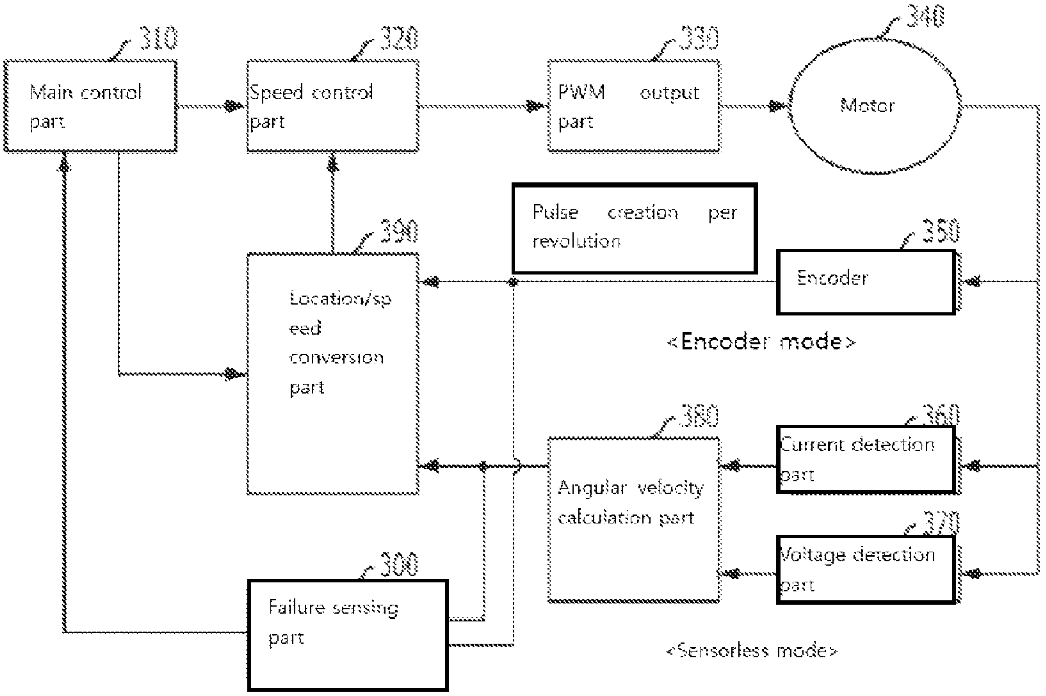
FIG. 3 shows the configuration of the embodiment of the dual control device of the door of present invention.

The FIG. 3 is the configuration drawing for and embodiment of the dual control device of the door in present invention.

As it was shown in FIG. 3, the dual control device on the door of present invention adapts the encoder mode and the sensorless mode in integration for dual control on the door. It enables to control the door successively by changing into other mode in case of failure creation while using one mode in usual time. For this matter, the dual control device on the door includes the main control part (310), speed control part (320), PWM output part (330), motor (340), encoder (350), location/speed conversion part (390) to realize the encoder mode. In addition, the dual control device of the door includes the main control part (310), speed control part (320), PWM output part (330), motor (340), encoder (350), location/speed conversion part (390) to realize the encoder mode. Such constituent elements of the control device on the door are overlapped with the previous description (Refer to the FIGS. 1A and 1B and 2) in its processing of encoder mode or the sensorless mode, so the person who is involved in the part will understand easily without specific explanation for each constituent element.

Especially, the dual control device on the door includes the failure sensing part (300) for sensing the created failure disturbing the normal operation by checking the operation state of the mode decided by the main control part (310), namely the encoder mode or the sensorless mode. Here, the failure sensing part (300) senses the creation of the failure by checking the state of the encoder (350) in case of the encoder mode [For example, the number of pulses created from the encoder (350) and the abnormalities on the phase of the pulse]. In addition, the failure sensing part (300) sense the creation of the failure by checking the state of the angular velocity [For example, the abnormalities on the measured data such as voltage, electric current of the motor (350)] calculation part (380) in case of the sensorless mode.

Hereunder, the conversion process of the encoder mode and sensorless mode in the dual control device of the door is explained in detail.

The main control part (310) of the dual control device of the door decides either of the encoder mode or the sensorless mode as a primary operation mode depending on the selection of the user or the control system environment of the train door and decides another one as a backup operation mode. Here, the primary operation mode becomes the operation mode to control the door in usual time and the backup operation mode can be converted into the primary operation mode in case of failure creation in the primary operation mode. Especially, the encoder ode and sensorless mode are performed simultaneously regardless of the mode decision by the main controlling part (310) in the desirable embodiment as it was depicted in the FIG. 3 and the adaption of the encoder mode and sensorless mode is decided in controlling the door depending on the mode decision by the main control part (310). It is to control the door immediately upon relaying the motion performed in the primary operation mode by the back operation motion because the door moving distance is being checked independently at the backup operation mode in spite that the door is located at arbitrary point at the failure creation in the primary operation mode by controlling the door independently with encoder mode and sensorless mode.

Additionally, the main control part (310) may include the communication part (Not described in FIG. 3) to inform the failure creation information in the encoder mode or the sensorless mode to the operator room and central control center.

As an example, the case of the assumption by deciding the encoder mode as primary operation mode and sensorless mode as a backup operation mode in the main control part (310) is illustrated. Firstly, main control part (310) calculates the door moving distance though the encoder mode by controlling the location/speed converting part (390). Namely, location/speed conversion part (390) calculates the door moving distance using the 'number of pulse' and 'screwpitch' transmitted from the encoder (350) and its results are provided to the speed control part (320). Later, when the main control part (310) receives the sensed failure result from the failure sensing part (300) in encoder mode, it controls the location/speed conversion part (390) for the sensorless mode to be operated a primary operation mode to control the door by converting the sensorless mode which is the backup operation mode into the primary operation mode. Namely, the location/speed conversion part (390) calculates the door moving distance using the 'angular velocity' and 'screwpitch' which are transmitted from the angular velocity calculating part (380) and its result is provided to the speed control part (320). On the other hand, the person who is involved in this field can understand easily the fact that present invention decides the sensorless mode as a primary operation mode in the main control part (310) and it can be adapted the case of deciding the encoder mode as a backup operation model.

FIG. 4A to FIG. 4D are the illustrative diagram for the embodiment of the dual control method on the door by FIG. 3.

Figure 4A:
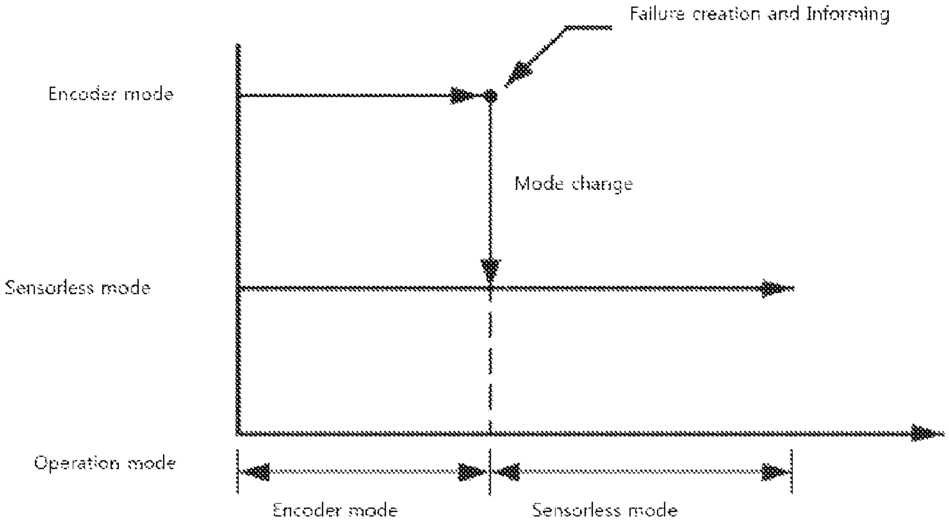
FIG. 4A to FIG. 4D are the illustrative diagram for the embodiment of the dual control method on the door by FIG. 3.
Figure 4B:
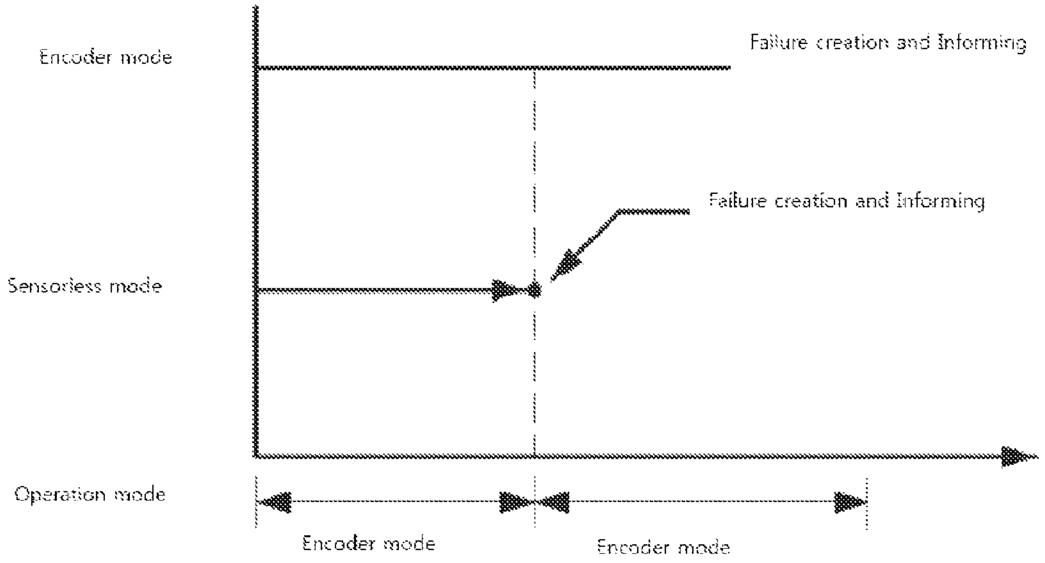
Figure 4C:
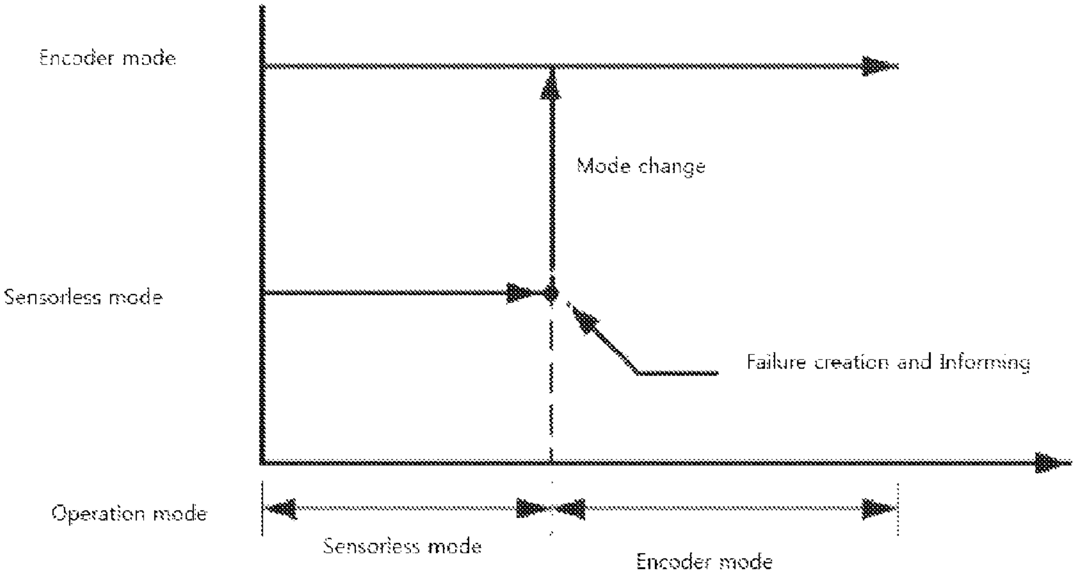
Figure 4D:
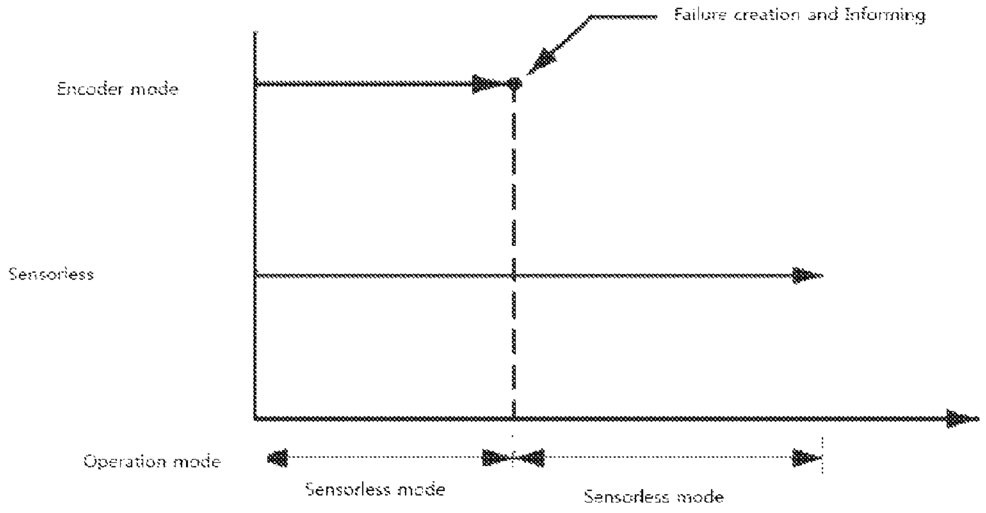

The primary operation in FIG. 4A and FIG. 4B is 'encoder mode' and the backup operation mode is 'sensorless mode' and FIG. 4C and FIG. 4D display the case that the primary operation mode is 'sensorless mode' and the backup operation mode is 'encoder mode.'

First, the explanation on the FIG. 4A and FIG. 4B is that the door can be controlled normally without disturbing the driving of the train by changing the mode into the sensorless mode of backup operation mode when the failure is created in the encoder mode which is the primary operation mode for controlling the door in the dual controlling device in the door. (Refer to FIG. 4A.) At this time, the dual control device on the door delivers the failure creation in encoder mode to the operator room or central control room. Additionally, the dual control device on the door can control the door normally because the encoder mode which is the primary operation mode is operated normally when the failure is created in the sensorless mode which is the backup operation mode for door controlling. (Refer to FIG. 4B.), However, the dual control device on the door informs the creation of the failure in the sensorless mode to the operator room or central control room because the sensorless mode which is the backup operation mode is provided against the failure creation in the primary operation mode.

Next, the explanation on the FIG. 4C and FIG. 4D is that the door can be controlled normally without disturbing the driving of the train by changing the mode into the encoder of backup operation mode when the failure is created in the sensorless mode which is the primary operation mode for controlling the door in the dual controlling device in the door. (Refer to FIG. 4C.) At this time, the dual control device on the door delivers the failure creation in encoder mode to the operator room or central control room. Additionally, the dual control device on the door can control the door normally because the sensorless mode which is the primary operation mode is operated normally when the failure is created in the encoder mode which is the backup operation mode for door controlling. (Refer to FIG. 4D.), However, the dual control device on the door informs the creation of the failure in the encoder mode to the operator room or central control room because the encoder mode which is the backup operation mode is provided against the failure creation in the primary operation mode.

Figure 5:
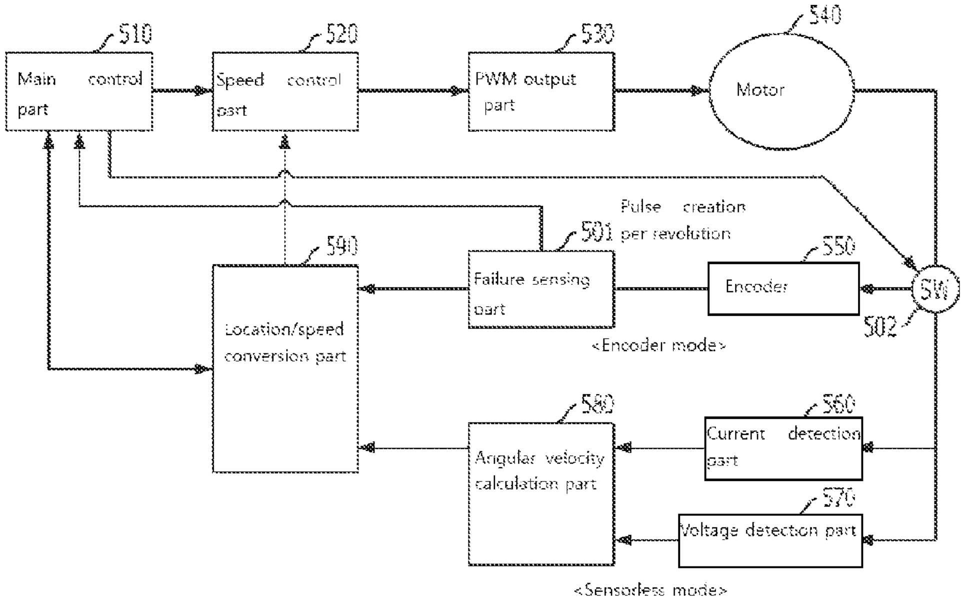
FIG. 5 shows the configuration of another embodiment of dual control device for the door of present invention.

FIG. 5 is the configuration diagram of another embodiment for dual control device of the door according to present invention.

The door control device on the door depicted in FIG. 5 is another embodiment of the FIG. 3 in the above. It adapts the encoder mode and sensorless mode in sequence for the dual control on the door, but firstly, it uses the encoder mode for controlling the door and it control the door using the sensorless mode in case of failure creation of the encoder mode. Here, the dual control device of the door is able to control the door by re-adapting the screw pitch data adapted into the encoder mode into the sensorless mode when the sensorless mode is adapted after the encoder mode (namely, in case of failure creation in encoder mode.) On the contrary, the dual control device on the door cannot adapt the encoder mode after the sensorless mode. It is because the 'number of pulse on the motor' shall be checked due to the characteristics of the encoder mode, but the 'number of the motor pulse' cannot be provided from the sensorless mode in case of failure creation at the arbitrary point of the door and the 'number of the motor pulse' cannot be checked because the dual control device operates at the failure creation in the encoder mode without concurrent performance with the sensorless mode in the encoder mode either. Accordingly, the dual control device on the door in the embodiment of FIG. 5 shall adapt the sensorless mode sequentially after the encoder mode.

On the other hand, the dual control device on the door includes the main control part (510), speed control part (520), PWM output part (530), motor (540), encoder (550), location/speed conversion part (590) to realize the encoder mode as indicated in the FIG. 3 as above and include the main control part (510), speed control part (520), PWM output part (530), motor (540), electric current detection part (560), voltage detection part (570) and location/speed conversion part (590) to realize the sensorless mode. The details of explanation are not made as it is overlapped with the previous description. Especially, the dual control device on the door includes the failure sensing part (501) which senses the creation of the failure disturbing the normal operation by checking the operating state of the encoder mode and switching part (502) for mode conversion of the encoder mode and sensorless mode. Here, failure sensing part (501) senses the creation of failure by checking the state of encoder (550), [For example, the abnormality on the number of pulse generated from the encoder (550) and error creation on the pulse phase generated from the encoder (550)].

Hereunder, the processes of the conversion to the sensorless mode after the encoder mode of the dual control device on the door are explained specifically.

The main control part (510) on the dual control device of the door decides the encoder mode as a primary operation mode and sensorless mode as a backup operation mode. Here, the primary operation mode becomes the primary operation mode for controlling the door in usual time and backup operation mode becomes the primary operation mode for door controlling by converting the primary operation mode during failure creation in the primary operation mode.

Firstly, the main control part (510) controls switching part (502) to decide the encoder mode as a primary operation mode. At this time, the main control part (510) calculates the door moving distance via encoder mode by controlling the location/speed conversion part (590). Namely, the location/speed conversion part (590) calculates the door moving distance using the 'number of pulse' and 'screwpitch' transmitted from the encoder (550) and its result is provided to the speed control part (520). At this time, the failure control part (501) senses the creation of failure by checking the state of encoder (550) as it was described. Later, the main control part (510) controls the switching part (502) for the sensorless mode to operate as a primary operation mode to control the door by converting the sensorless mode which is the backup operation mode into the primary operation. At this time, the main control part (510) makes the continuous door control in spite of the converting of the primary control mode from encoder mode to the sensorless mode for the screw pitch data adapted to the encoder mode to be re-adapted to the sensorless mode by controlling the location/speed control part (590). Accordingly, the location/speed conversion part (590) calculate the door moving distance using the 'angular velocity' and 'screwpitch' transmitted from the angular velocity calculating part (580) and its result is delivered to the speed control part (520).

Additionally, the main control part (510) may include the communication module (Not describe in FIG. 5) to inform the created failure information in the encoder mode or sensorless mode to the operator room of the train or central control center.

Figure 6:
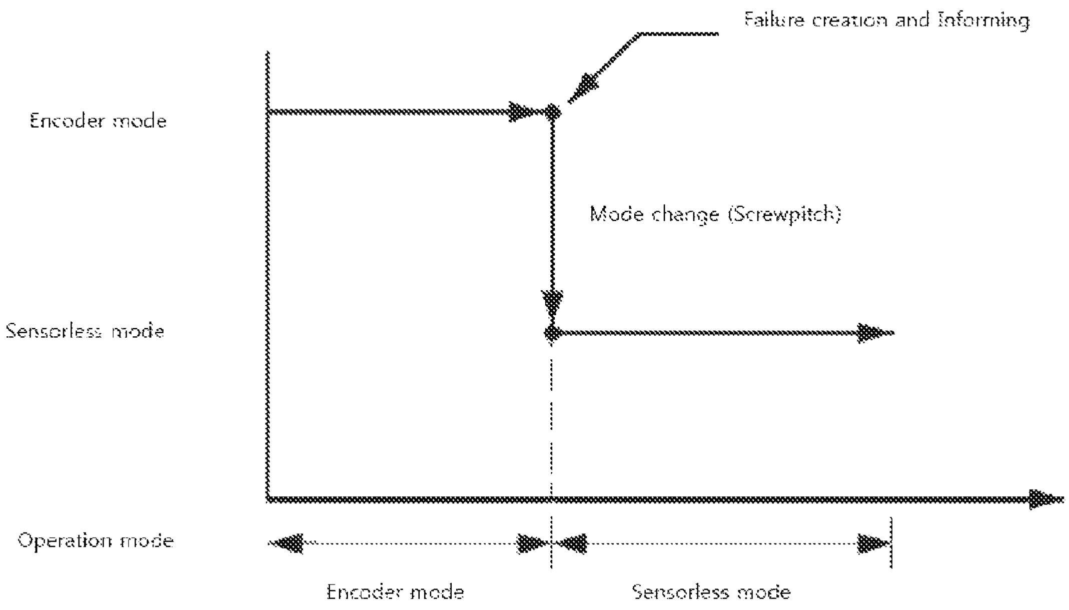
FIG. 6 shows the explanation on the other embodiment of dual control method for the door of present invention according to FIG. 5.

FIG. 6 is an explanation diagram for another embodiment for the dual control method on the door by FIG. 5 in the above.

FIG. 6 displays the case that the main mode is the 'encoder mode' and the sub mode is the 'sensorless mode.'

The dual control device on the door is able to control the door normally without disturbing the operation of the train by changing the sensorless mode which is the backup control mode into the primary control mode for controlling the door when the failure is created in the encoder mode which is the primary control mode for door controlling. At this time, the dual control device on the door re-adapts the screw pitch data adapted to the encoder mode to the sensorless mode. And the dual control device on the door informs the creation of the failure in the encoder mode to the operator room or central control room.

On the other hand, as it was describe in the above, the methods of present invention can be made by computer. And the code and code segment which constitute the above program can be conjectured easily by the computer programmer for the corresponding field. In addition, the method of present invention is to be realized by saving the program provided in the above into the recording media (information saving media) readable by computer and read and implemented by the computer. In addition, the above recording media includes every type of recoding media which can be read by the computer.

As it was set out in the above, the explanation was made by referring the desirable embodiment of present invention, but the skilled person who is involved into the corresponding technology part many understand the present invention can be modified and changed in variety within the range not to deviate the idea and realm of the present invention described on the scope of the patent claims hereunder.

What is claimed is:

1. A dual control method for door comprising a first performance stage performing door control by deciding either of an encoder mode or a sensorless mode as a primary operation mode to control the door;

a transforming stage converting the said primary operation mode to another mode when a failure is sensed in said primary operation mode; and a second performing stage controlling the door by calculating a door moving distance depending on the converted primary operation mode, wherein the door moving distance is calculated using number of pulses from motor and screw pitch in case of said primary operation mode is the encoder mode in said first and second performing stages, and the door moving distance is calculated by using angular velocity of the motor and screw pitch in case of said primary mode is the encoder mode.

2. The dual control method for door according to claim 1, wherein performing the encoder mode and the sensorless mode concurrently regardless of deciding said primary operation mode in said first performing stage.

3. The dual control method for door according to claim 1, wherein said transforming stage includes an informing stage informing an information for the failure creation to the external device.

4. A dual control method for door comprising a first performance stage for performing door control by deciding an encoder mode as a primary operation mode to control the door;

a switching stage for converting the primary operation mode to sensorless mode when the failure is sensed in the encoder mode decided; and a second performing stage for controlling the door by calculating a door moving distance depending on the switched sensorless mode using a screw pitch adapted to the encoder mode, wherein calculating a door moving distance using number of motor pulse and screw pitch in the first performance stage, and a calculating a door moving distance using a angular velocity of motor and screw pitch in the second performance stage.

5. The dual control method for door according to claim 4, wherein the switching stage includes an informing stage informing an information for the failure creation to the external device.

* * * * *